United States Patent [19]

Lindner et al.

[11] Patent Number: 4,774,271

[45] Date of Patent: Sep. 27, 1988

[54] PROCESSING OF POLYMER DISPERSIONS BY SPRAY DRYING

[75] Inventors: Christian Lindner, Cologne; Pol Bamelis, Bergisch Gladbach; Jürgen Hinz; Dieter Wittmann, both of Krefeld; Otto Koch; Burkhard Braun, both of Cologne, all of Fed. Rep. of Germany

[73] Assignee: Bayer Aktiengesellschaft, Leverkusen, Fed. Rep. of Germany

[21] Appl. No.: 13,728

[22] Filed: Feb. 9, 1987

[30] Foreign Application Priority Data

Feb. 22, 1986 [DE] Fed. Rep. of Germany ....... 3605801

[51] Int. Cl.⁴ ............................................... C08K 3/20
[52] U.S. Cl. ..................................... 523/342; 525/482
[58] Field of Search .......................... 523/342; 528/482

[56] References Cited

U.S. PATENT DOCUMENTS 4,133,947 1/1979 Kalka et al. ......................... 528/502
4,263,426 4/1981 Cooper et al. ...................... 528/486

Primary Examiner—Joseph L. Schofer
Assistant Examiner—Peter Mulcahy
Attorney, Agent, or Firm—Connolly and Hutz

[57] ABSTRACT

The invention relates to a process for the recovery of thermoplastic polymers from aqueous dispersions by spray-drying after treatment with carboxylic acid of formula I

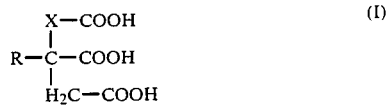

wherein
X is a single bond, —CH$_2$— or —C$_2$H$_4$—, and
R is —H, —OH or

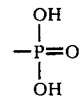

9 Claims, No Drawings

PROCESSING OF POLYMER DISPERSIONS BY SPRAY DRYING

The invention relates to a process for the processing of dispersions of thermoplastic polymers by spray-drying, polymers being produced which yield high quality thermoplastic moulded articles.

Thermoplastic polymers, such as, ABS, SAN, PVC, MBS, polystyrene or graft polymers of various monomers on rubber bases (which are useful, for example, as impact modifiers), are frequently produced by dispersion polymerization. They are thus primarily obtained as a dispersion from which the polymers can be isolated by coagulation, for example, by means of electrolytes or by spray-drying. The term "dispersion" is understood here and in the following as including emulsions, especially dispersions, emulsions and latices of polymers which are produced by emulsion polymerisation techniques.

Whereas the crude polymers can be washed during or after the processing by coagulation, in order to remove polymerization and coagulation auxiliaries to a large extent, purification is not possible when polymers are spray-dried.

Such contaminants can have a very adverse effect on the physical properties of a thermoplastic moulding material. Various polymers are produced at alkaline pHs by dispersion polymerization, with dispersing agents of the fatty acid salt type. For specific applications of of these polymers the emulsifier remaining in the processed polymer must be present predominantly in the free acid form. This can easily be achieved when the dispersions are subjected to electrolytic coagulation under acidic conditions, it is, however, impossible when processing is by spray-drying, mainly for two reasons: the alkaline dispersion cannot be adjusted to an acid pH without partially becoming instable or even coagulated. If the adjustment to a pH less than 7 were nevertheless to succeed, the acid and salts remaining in the polymer after the spray-drying would impair its properties important for application.

It has now been found that dispersions of thermoplastic polymers can be acidified to a PH of below 7 with selected acids and then spray-dried yielding crude polymers which contrary to expectation can be processed to high quality thermoplastic moulding materials.

Dispersions which have been produced with a mixture of fatty acid salts and salts of organic sulphonic acids as emulsifiers are particularly suitable for this process; these dispersions—are sufficiently stable even after acidification—so that no coagulate precipitates are formed and spray-drying is possible.

The invention therefore relates to a method of recovering polymers by spray-drying, wherein dispersions of thermoplastic polymers of olefinically unsaturated monomers are treated with at least one carboxylic acid of the formula (I)

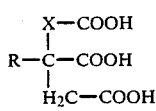

in which
X denotes a single bond, —CH$_2$— or —C$_2$H$_4$—, and
R denotes —H, —OH or

the pH of the dispersions is optionally adjusted to less than 7, particularly to 6–4, the emulsions or dispersions are spray-dried and the thermoplastic polymers are recovered as a powder.

Particularly suitable dispersions of thermoplastic polymers contain mixtures of alkali metal salts of carboxylic acids and alkali metal salts of organic sulphonic acids as emulsifiers which have a pH—before acidification—of greater than 7, particularly of 8–11.

The invention further relates to thermoplastic moulding materials which contain polymers recovered according to the invention.

In the context of the invention, thermoplastic polymers are e.g. graft copolymers of olefinically unsaturated monomers such as styrenes, α-methylstyrenes, acrylonitrile, methacrylonitrile, alkyl methacrylates having up to 8 C atoms in the alkyl group, alkyl acrylates having up to 8 C atoms in the alkyl group, vinyl chloride, vinyl acetate and vinylidene chloride on a rubber selected from diene rubbers, preferably a polymer of butadiene or isoprene incorporating up to 40% by weight of comonomers such as styrene, acrylonitrile, methyl methacrylate and alkyl acrylate; alkyl acrylate rubbers, optionally incorporating up to 10% by weight of comonomers selected from styrenes, acrylonitrile, methyl methacrylate, vinyl ethers and vinyl esters; olefin rubbers comprising the ethylene-vinyl acetate copolymers, ethylene-acrylate copolymers and ethylene-propylene copolymers. Rubbers having an at least partially crosslinked structure, preferably with a gel content of above 50% by weight, are particularly suitable.

Preferred graft polymers have rubber contents of more than 15% by weight, particularly more than 30% by weight, particularly preferable of 50–80% by weight. Such graft polymers are known.

Dispersions of the thermoplastic polymers in water are subjected to the process according to the invention. They are produced by graft copolymerization of the above identified monomers onto rubbers of the above-mentioned type which are in dispersion form. These graft copolymerizations are of the free-radical type and are induced by free-radical formers, such as water-soluble persulphates, perphosphates, H$_2$O$_2$, hydroperoxides or azo compounds.

An emulsifier which stabilizes the dispersion is present in amounts sufficient for adequate emulsion stabilization, conventionally in amounts up to 3% by weight, particularly up to 2% by weight, based on polymer solids.

The emulsifiers suitable in the invention are anionic and contain in their molecule as the active group structure elements

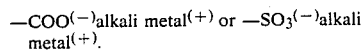

Emulsions which contain mixtures of at least one alkali metal salt of a carboxylic acid and at least one alkali metal salt of an organic sulphonic acid, are particularly preferred.

In the context of the invention, anionic emulsifiers constituting alkali metal salts of carboxylic acids are selected from inter alia alkali metal salts of saturated or unsaturated or substituted long-chain or cyclic carboxylic acids, for example, salts of lauric acid, myristic acid, stearic acid, oleic acid, linseed oil fatty acid; resin acids (disproportionated abietic acid or colophonium soaps), salts of linoleic acid and salts of ether-carboxylic acid. These emulsifiers are known.

Anionic emulsifiers comprising alkali metal salts or organic sulphonic acids are e.g. (substituted) alkyl- or arylsulphonates, for example, primary or secondary long-chain alkylsulphonates, alkylnaphthalenesulphonates, alkylbenzenesulphonates, and esters of sulphosuccinic acid with higher alcohols and mahogany acids. These emulsifiers are known. (In this context, see also: Houben-Weyl, Methoden der organischen Chemie (Methods or Organic Chemistry), Volume XIV/1, Macromolecular Substances).

Mixtures of resin acids or soaps of long-chain fatty acids and long-chain alkyl- or alkylarylsulphonates are particularly preferred.

The dispersions can have pHs of about 11-3, emulsions with pHs greater than 7 being particularly suitable.

According to the invention, at least one tricarboxylic acid of the formula (I) is added to the dispersions; acids of the formula (I) are, for example, propanetricarboxylic acids and butane-tricarboxylic acids, citric acid and 2-phosphono-1,2,4-butanetricarboxylic acid being preferred and 2-phosphono-1,2,4-butanetricarboxylic acid being particularly preferred.

If the polymer dispersion (latex) already has a pH of less than 7, then the acids of the formula (I) are added to the dispersion before spray-drying, in amounts from 0.01 to 5% by weight, particularly 0.1-3% by weight, based on polymer.

If the polymer latex has a pH of greater than 7, then at least one acid of the formula (I) is metered into the dispersion until the emulsion has a pH of 6-4, particularly of 5-4.

The acids of the formula (I) are generally metered into the dispersions in the form of an aqueous solution, of course with sufficient mixing.

The acids of formula (I) are added to the dispersion at temperatures from 20° to 80° C., particularly from 20° to 50° C.

Even alkaline dispersions with a high solid content (of polymer) above 45% by weight can be acidified with the above identified acids without impairment of the dispersion stability. Particularly highly concentrated dispersions can be processed according to the invention when the dispersion is stabilized with the emulsifier mixture identified above.

After the addition of the acids of the formula (I) and, optionally, further conventional additives, such as antioxidants, the resulting dispersions are spray-dried under usual conditions. The thermoplastic polymers are recovered as fine or coarse powders. Surprisingly, these powders have an improved degree of whiteness.

The powders can be shaped by methods of thermoplastic processing, for example injection moulding, extrusion or rolling, and yield moulded articles of particularly high thermal stability and good natural color. Because of the improved stability, it is also possible to apply particularly economical processing conditions (such as shorter moulding cycles due to higher processing temperatures).

It has also been found that mixtures of known thermoplastic resins and graft polymers prepared according to the process of the invention have better applicational properties than corresponding moulding materials which have been obtained from conventionally prepared spray-dried graft polymers. Particularly noteworthy here is improved toughness, particularly at low temperatures, and also processability and thermal stability of the thermoplastic moulding materials.

In the context of the invention, thermoplastic moulding materials are thus mixtures of at least one graft polymer recovered according to the invention, particularly with a rubber content of greater than 25% by weight, particularly preferably of greater than 50% by weight, and at least one conventional thermoplastic resin. The thermoplastic moulding materials preferably contain up to 50% by weight of graft polymer, particularly preferably up to 35% by weight of graft polymer.

Suitable thermoplastic resins are styrene or α-methylstyrene copolymers with conomoner contents of up to 35% by weight with inter alia acrylonitrile, methyl methacrylate and N-substituted maleimide as comonomers; methyl methacrylate polymers with comonomer contents of up to 10% by weight with inter alia styrene, alkyl acrylates (having up to 6 C atoms in the alcohol part) and vinyl ether as comonomers; polyvinyl chloride; resins such as polyesters, polycarbonates or polyamides. The polyesters are preferably terephthalic acid polyesters with ethylene glycol or butylene glycol; the polyamide resins are crystalline, partially crystalline or amorphous, particularly nylon 6 or nylon 66. The polycarbonates are of bisphenols, particularly 2,2-bis(4-hydroxyphenyl)-propane (bisphenol A).

Particularly preferred thermoplastic moulding materials are SAN, AMS (α-Methylstyrol-Acrylnitril-copolymerharz) resins, PVC, nylon 6, nylon 66, polybutylene terephthalate or bisphenol A polycarbonate with at least one graft polymer prepared according to the invention. More than two components can, of course, be used.

EXAMPLES

1. Graft rubber dispersions 1.1 The following are placed in a reactor;

2,370 parts by weight of a polybutadiene dispersion having a solids content of 50% by weight and a gel content of 87% by weight (Emulsifier; the Na salt of disproportionated abietic acid, Manufacture: by free-radical dispersion polymerization at a pH of 10; Average latex particle diameter ($d_{50}$): 0.38 μm;) and 900 parts by weight of water.

After heating to 65° to 67° C., with stirring, the solution of 3.5 parts by weight of potassium peroxodisulphate in 100 parts by weight of water is added as an initiator. The solutions listed below are subsequently fed separately into the reactor within 4 hours at 65° C. with stirring.

Solution (a)
  270 parts by weight of methyl methacrylate
  30 parts by weight of n-butyl acrylate Solution (b)
  410 parts by weight of water
  28 parts by weight of the Na salt of disproportionated abietic acid
  20 parts by weight of 1N sodium hydroxide solution.

After a further 4 hours, the graft polymerization is terminated. The resulting dispersion is stabilized using 2 parts by weight of phenolic antioxidants. The dispersion has a solids content of 35.9% by weight.

The pH of the dispersion is 8.48.

1.2 The following are placed in a reactor:

5,880 parts by weight of a polybutadiene dispersion, corresponding to that described in Example 1.1, and 800 parts by weight of water.

After heating to 65° to 67° C., with stirring, the reaction is initiated by means of a solution of 9 parts by weight of potassium peroxodisulphate in 75 parts by weight of water. The solutions listed below are subsequently fed separately into the reactor within 4 hours at 65° C. with stirring.

Solution (a)
  661 parts by weight of methyl methacrylate
  74 parts by weight of n-butyl acrylate
Solution (b)
  100 parts by weight of water
  65 parts by weight of the Na salt of a $C_{14}$–$C_{18}$-alkylsulphonic acid.

After a further 4 hours, the graft polymerization is terminated. The resulting dispersion is stabilized using 2 parts by weight of phenolic antioxidant. The dispersion has a solids content of 49% by weight, and the pH is 8.5.

1.3 The following are placed in a reactor:

4,650 parts by weight of a polybutadiene dispersion, corresponding to that described in Example 1.1, and 2,325 parts by weight of water.

After heating to 65° C., with stirring, the reaction is initiated by means of a solution of 6 parts by weight of potassium peroxodisulphate in 150 parts by weight of water. The solutions listed below are subsequently fed separately into the reactor within 4 hours at 65° C. with stirring.

Solution (a)
  562 parts by weight of styrene
  219 parts by weight of acrylonitrile
Solution (b)
  1,250 parts by weight of water
  30 parts by weight of the Na salt of a $C_{14}$–$C_{18}$-alkylsulphonic acid.

After a further 4 hours, the graft polymerization is terminated. The resulting dispersion is stabilized using 2 parts by weight of phenolic antioxidants. The dispersion has a solids content of 33% by weight and a pH of 9.

2. Preparation of the dispersions for spray-drying 2.1 20% by weight solutions of the acids 2.2.1 to 2.1.7 in water are added to the dispersion 1.1 until the dispersion has a pH of 4–5:
  2.1.1 acetic acid
  2.1.2 formic acid
  2.1.3 sulphuric acid
  2.1.4 hydrochloric acid
  2.1.5 phosphoric acid
  2.1.6 citric acid
  2.1.7 2-phosphono-1,2,3-butanetricarboxylic acid.

Coagulation and creaming of the dispersion is observed in each case. Further processing by spray-drying is not possible.

2.2 20% by weight solutions of the acids 2.2.1–2.2.6 in water are added to the latex 1.2 until the dispersion has a pH of 4–5.
  2.2.1 with acetic acid
  2.2.2 with sulphuric acid
  2.2.3 with phosphoric acid
  2.2.4 with formic acid
  2.2.5 with citric acid
  2.2.6 with 2-phosphono-1,2,4-butanetricarboxylic acid.

Dispersion which have a low viscosity and which are stable to shearing are obtained in all cases after acidification. The dispersion with acid 2.2.5 thereafter contains 0.653% by weight of citric acid, based on polymer solid. The dispersion with acid 2.2.6 thereafter contains 0.490% by weight of phosphonotricarboxylic acid, relative to the polymer solid.

2.3 20% by weight of solutions of the acids 2.3.1–2.3.3 in water are added to the latex 1.3 and the pH adjusted to 5.
  2.3.1 with acetic acid
  2.3.2 with formic acid
  2.3.3 with citric acid.

Dispersions which are stable to shearing are obtained in all cases after acidification.

It follows from experiments 2.1 to 2.3 that dispersions with an acidic pH can only be prepared from alkaline dispersions by addition of acids if the graft polymer emulsions in these cases have been prepared by means of a specific emulsifier mixture.

3. Spray-drying of the dispersions

In a laboratory spray-drier (Messrs. Nubilosa, Constance) with volume 1 m$^3$ the dispersions listed below were atomized using a two-fluid nozzle, and dried, at a hot gas temperature of 160° C. and an air outlet temperature of 80° C., to a residual moisture content of less than 0.5% by weight:
  3.1 Polymer from emulsion 1.2
  3.2 Polymer from emulsion 2.2.1
  3.3 Polymer from emulsion 2.2.2
  3.4 Polymer from emulsion 2.2.3
  3.5 Polymer from emulsion 2.2.4
  3.6 Polymer from emulsion 2.2.5
  3.7 Polymer from emulsion 2.2.6
  3.8 Polymer from emulsion 2.3.1
  3.9 Polymer from emulsion 2.3.2
  3.10 Polymer from emulsion 2.3.3.

4. Properties of the polymer powder

The degree of whitening of the powders 3.8, 3.9 and 3.10 is assessed visually.

Powder 3.8 +
Powder 3.9 +
Powder 3.10 +

+ = white powder

+ + = compared to powders 3.8 and 3.9, the degree of whitening is significantly greater.

5. Properties of the polymer powder in a thermoplastic moulding material 5.1 Thermoplastic resins employed
  5.1.1 Nylon 6 having a viscosity of $\eta_{rel}=2.9$, measured in m-cresol at 25° C. (as 1% strength solution).
  5.1.2 Nylon 6 having a viscosity of $\eta_{rel}=3.5$, measured in m-cresol at 25° C. (as 1% strength solution).

The nylons were mixed, in a continuous twin-screw extruder, with various amounts of graft polymer. The material temperature was 270°–180° C. The melt strand was degassed before the nozzle, cooled in water, granulated and dried. The moulding materials were processed into ASTM rods on an injection moulding machine. The Izod notched impact strength was tested. The flow length was furthermore determined.

Table 1 lists the compounds prepared. Table 2 lists some relevant applicational properties of the thermoplastic materials.

TABLE 1

Composition of the nylon compounds (data in % by weight)

| Example | Nylon type 5.1.1 | Nylon type 5.1.2 | Graft polymer | |
|---|---|---|---|---|
| 5.2 | 70 | | 30 | 3.1 |
| 5.3 | 70 | | 30 | 3.2 |
| 5.4 | 70 | | 30 | 3.3 |
| 5.5 | 70 | | 30 | 3.4 |
| 5.6 | 70 | | 30 | 3.5 |
| 5.7 | 70 | | 30 | 3.6 |
| 5.8 | 70 | | 30 | 3.7 |
| 5.9 | | 82,5 | 17,5 | 3.1 |
| 5.10 | | 82,5 | 17,5 | 3.2 |
| 5.11 | | 82,5 | 17,5 | 3.3 |
| 5.12 | | 82,5 | 17,5 | 3.4 |
| 5.13 | | 82,5 | 17,5 | 3.5 |
| 5.14 | | 82,5 | 17,5 | 3.6 |
| 5.15 | | 82,5 | 17,5 | 3.7 |

TABLE 2

Proporties of the thermoplastic moulding materials

| Example | Izod notched impack strength [J/m] | | | | Flow length [cm] |
|---|---|---|---|---|---|
| 5.2 | 1069 | — | 931 | 329 | 240 | — |
| 5.3 | 954 | — | 297 | — | — | 34,5 |
| 5.4 | 1052 | — | 805 | 714 | 174 | 23,5 |
| 5.5 | 912 | — | 216 | — | — | 33,5 |
| 5.6 | 1020 | — | 428 | 230 | — | 26 |
| 5.7 | 1039 | — | 802 | 657 | 185 | 32 |
| 5.8 | 1060 | — | 900 | 605 | 240 | 34 |
| 5.9 | 989 | — | 254 | — | — | — |
| 5.10 | 146 | — | — | — | — | — |
| 5.11 | 1143 | 455 | 222 | — | — | — |
| 5.12 | 1120 | 582 | 216 | — | — | — |
| 5.13 | 161 | — | — | — | — | — |
| 5.14 | 1326 | 670 | 514 | — | — | — |
| 5.15 | 1290 | 605 | 560 | — | — | — |

A comparison of the results listed in Table 2 shows that:

Of the moulding materials containing 30% by weight of graft rubber, the moulding material 5.2 based on an alkaline dispersion does not have optimum properties.

The moulding materials based on the acidic dispersions 5.3 to 5.8 differ by means of the acid employed for the acidification: only sulphuric acid, citric acid and phosphonotricarboxylic acid lead to moulding materials having good toughnesses, even at low temperatures.

An analogous property behaviour can be seen from the further moulding material data (5.9 to 5.14). The moulding materials 5.14 and 5.15 according to the invention have excellent low temperature toughness.

We claim:

1. A process for the processing of a thermoplastic graft co-polymer of olefinically unsaturated monomers grafted onto a rubber by spray-drying, in which a dispersion of a thermoplastic graft polymer is treated with at least one carboxylic acid of the general formula $$\begin{array}{c} X-COOH \\ | \\ R-C-COOH \\ | \\ H_2C-COOH \end{array} \quad (I)$$

in which

X denotes a single bond, —CH$_2$— or —C$_2$H$_4$—, and
R denotes —H, OH or OH $$\begin{array}{c} -P=O \\ | \\ OH \end{array}$$

said dispersion prepared by means of a mixture of an alkali metal salt of a carboxylic acid and an alkali metal salt of an organic sulphonic acid as emulsifier, and the pH of the dispersion being adjusted, if required, to a value less than 7, the resulting dispersion is then subjected to spray-drying and the thermoplastic graft co-polymer, is recovered in powder form.

2. A process according to claim 1 wherein olefinically unsaturated monomers are styrenes, alpha-methyl styrenes, acrylonitrile, methacrylonitrile, alkyl methacrylates having 1 to 8 carbon atoms in the alkyl group, alkyl acrylates having 1 to 8 carbon atoms in the alkyl group, vinyl chloride, vinyl acetate and vinylidene chloride, and the rubber is a diene rubber, alkyl acrylate rubber or olefin rubber.

3. A process according to claim 1, in which the carboxylic acid of formula (I) is a propanetricarboxylic acid, a butanetricarboxylic acid or citric acid.

4. A process according to claim 1, in which the carboxylic acid of formula (I) is 2-phosphono-1,2,4-butanetricarboxylic acid.

5. A process according to claim 1, in which the pH of the dispersion is adjusted to 3 to 4.

6. A polymer whenever produced by the process of claim 1.

7. A thermoplastic moulding material containing a polymer according to claim 6.

8. A process according to claim 3 in which the pH of the dispersion is adjusted to 3–4.

9. A process according to claim 4 in which the pH of the dispersion is adjusted to 3–4.

* * * * *